United States Patent [19]

Sass et al.

[11] Patent Number: 4,996,775
[45] Date of Patent: Mar. 5, 1991

[54] IMAGE READER GUIDE

[76] Inventors: William Sass, 381 Evergreen Dr., Brick Town, N.J. 08723; Arthur Martin, 306 East Sidney Ave., Mount Vernon, N.Y. 10553

[21] Appl. No.: 432,228

[22] Filed: Nov. 6, 1989

[51] Int. Cl.$^5$ .............................................. G08C 21/00
[52] U.S. Cl. ...................................... 33/1 M; 358/473
[58] Field of Search ............... 33/403, 430, 1 AA, 573, 33/32.2, 42, 41.1, 41.2, 23.03, 1 S, 1 C, 1 G, 1 L, 1 R; 235/472, 482–486, 449; 358/473; 434/116, 117; 250/566, 555, 271

[56] References Cited

U.S. PATENT DOCUMENTS 4,797,544 1/1989 Montgomery et al. ......... 358/473 X

FOREIGN PATENT DOCUMENTS 3006579 8/1981 Fed. Rep. of Germany ...... 250/566

Primary Examiner—Harry N. Haroian
Attorney, Agent, or Firm—Clifford G. Frayne

[57] ABSTRACT

An image reader guide for hand-held image readers for the transfer of printed or textual matter to a data storage device whereby the hand-scanner is repeatedly, selectively aligned with the printed matter through the use of a U-shaped planar guide and planar template tray which interlock with each other to provide a manual guide for the use of the hand scanner in positioning the hand scanner over the printed matter for reading and transfer to the data storage source.

1 Claim, 3 Drawing Sheets

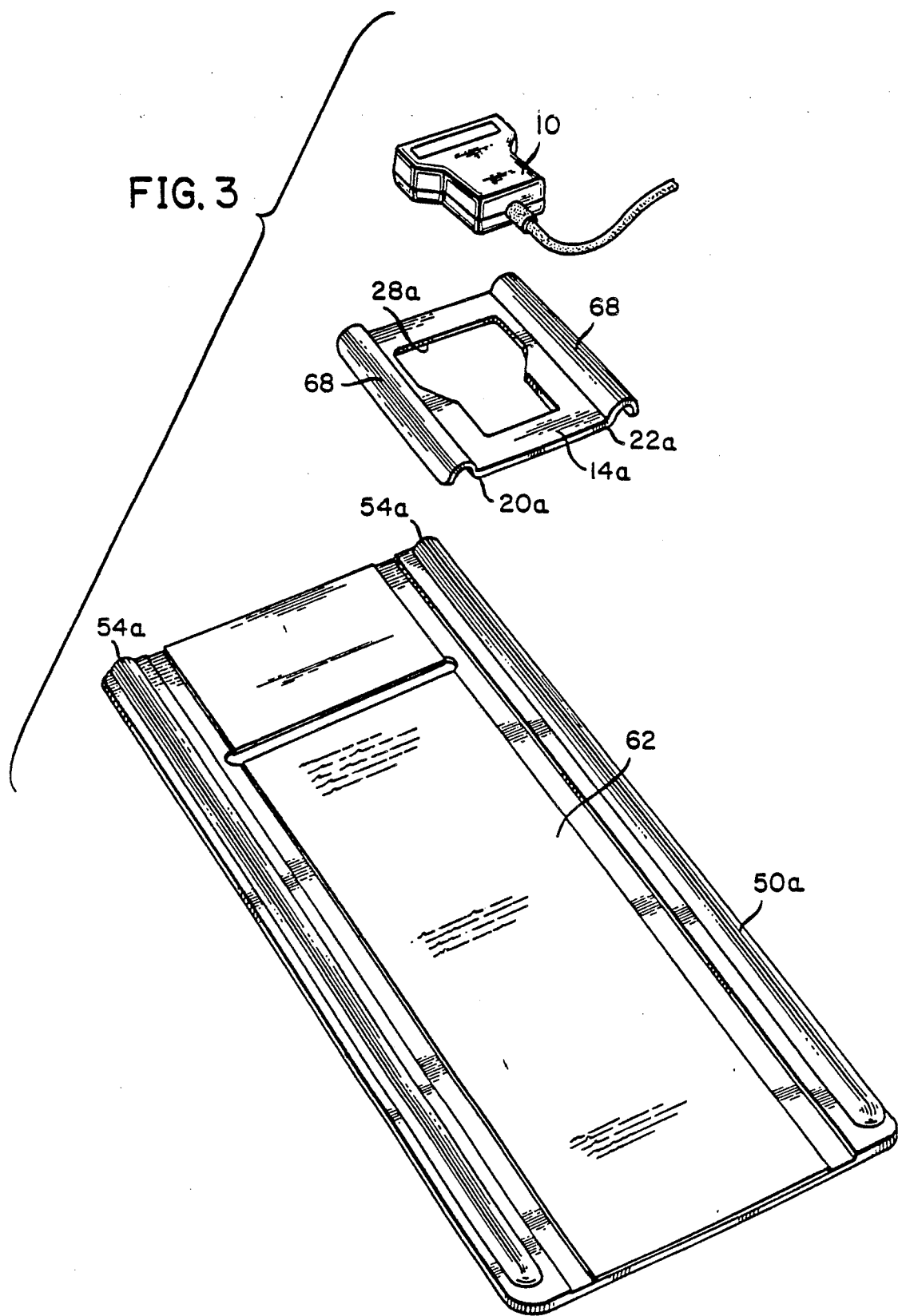

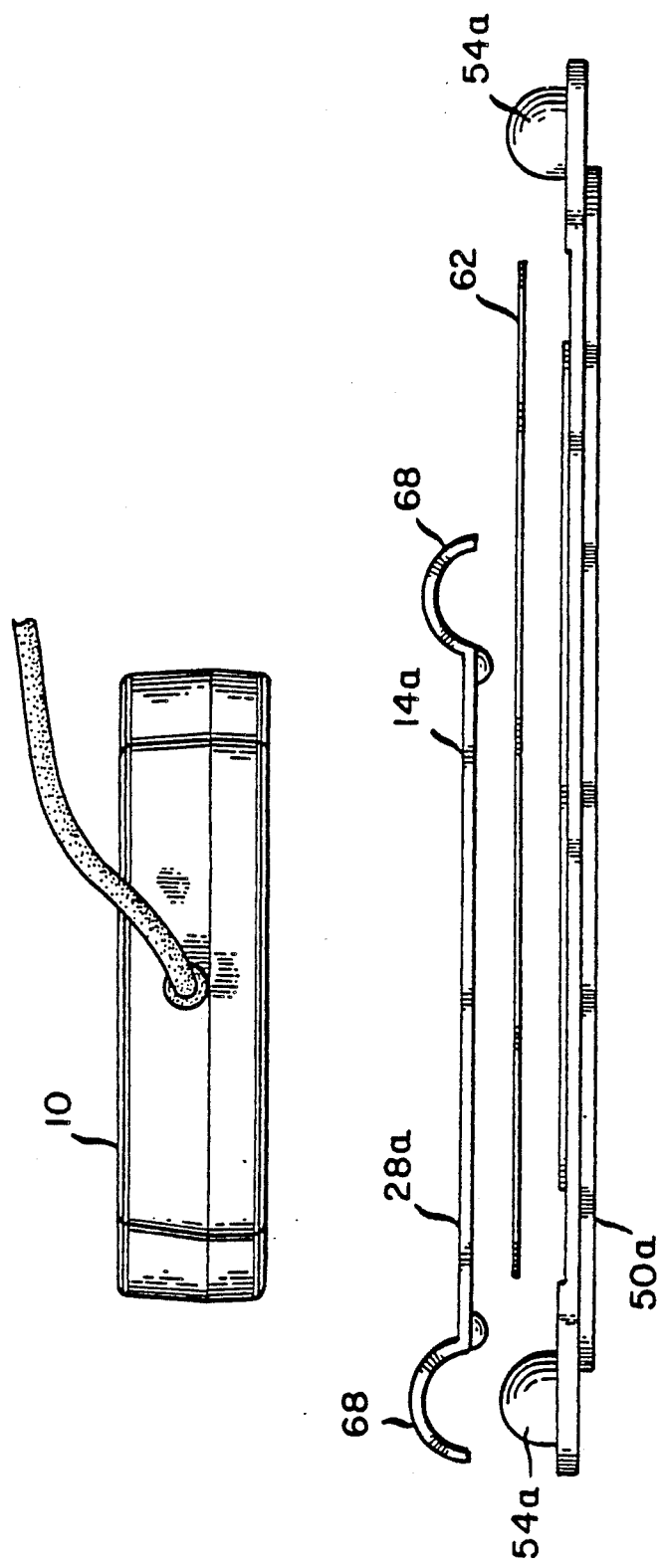

IMAGE READER GUIDE

FIELD OF INVENTION

The present invention relates to a guide mechanism for use with a manual image reader to input textual material into a computer.

BACKGROUND OF THE INVENTION

Hand scanners or desk-top scanners are utilized in order to scan text material, images or graphics and to transmit the scanned material into a computer. The scanners of a hand-held type and are usually designed to read a typical 8 ½×11 inch page by being drawn first down one vertical half of the page and then being drawn down the second vertical half of the page. The dimensions of the scanner are such that combined with the software of the scanner, the page is reconstructed within the computer and stored for future use.

A difficulty arises with the use of a hand-held scanner in that the steadiness or rather unsteadiness of the operator's hand, while sometimes affecting the vertical half page which is being read, will oftentimes affect the matchup within the computer of the two vertical halves of the page. Thus, the operator may find that the center of the page or graphic being scanned will be illegible or difficult to read within the computer. This would require the operator to rescan the page in order to have a legible copy.

Operators oftentimes would attempt to utilize a book or straight-edge in order to avoid the aforesaid problem. Applicant's invention relates to a template and guide easily adaptable to different size paper and designed to conform to the reading head of the scanner in order to ensure that the operator draws the scanner over one vertical half of the document being read and over the second vertical half of the document being read such that the software associated therewith can accurately match the two vertical halves into a single document within the computer which is legible and readable.

OBJECTS OF THE INvENTION

An object of the present invention is to provide for a novel and unique template and guide for use with a computer hand scanner in order to transfer textual or graphic material to a computer in legible form.

A further object of the present invention is to provide for a novel and unique template and guide mechanism for use with a hand scanner to ensure legible transfer of textual or graphic material to a computer.

A still further object of the present invention is to provide for a novel and unique template and guide mechanism which will transfer textual or graphic material of various sizes to a computer in legible form.

BRIEF DESCRIPTION OF THE DRAWINGS

These and other objects of the present invention will become more apparent from the following description when taken in conjunction with the accompanying drawings wherein:

FIG. 3 is a perspective view of a second embodiment of the template tray and guide mechanism; and FIG. 4 is an end view of the template tray, paper guide and scanner.

DETAILED DESCRIPTION OF THE DRAWINGS

Figure 1:
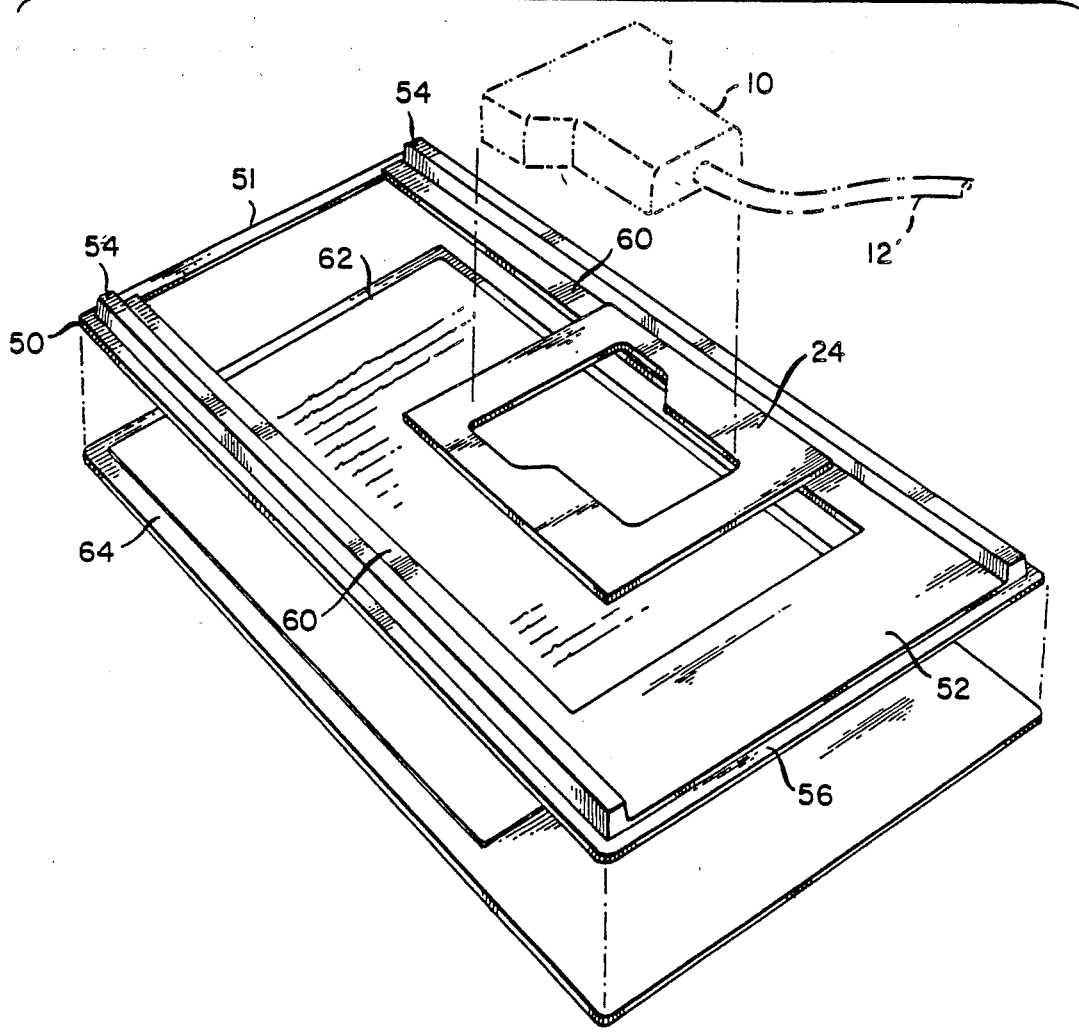
FIG. 1 is a perspective view of the first embodiment detailing the template tray and guide mechanism.

FIG. 1 details a first embodiment of the invention detailing the template and guide mechanism. The hand scanner 10 is an accessory provided for the personal computer by the manufacturer and comprises a hand-held optical character reader connected electrically to the computer. It will be recognized by those skilled in the art that the optical character reader or hand scanner 10 may vary in size and configuration and the disclosure herewith is not meant to be limited by the configuration of the hand scanner 10 or optical character reader as shown.

In normal usage, the hand scanner or optical character reader 10 is designed to be drawn or manipulated over the vertical one-half of a page in order to read the characters on the page and transfer such characters via the reading by way of electrical communication 12 to the memory bank of the personal computer. The hand scanner 10 or optical character reader would then be drawn or manipulated over the second vertical half of the page in the same manner with the same result.

Applicant's invention is directed towards a guide and template for use with a hand scanner and the page containing the textual or graphic material in order to ensure that the material is transferred accurately and legibly to the memory bank of the computer.

Figure 2:
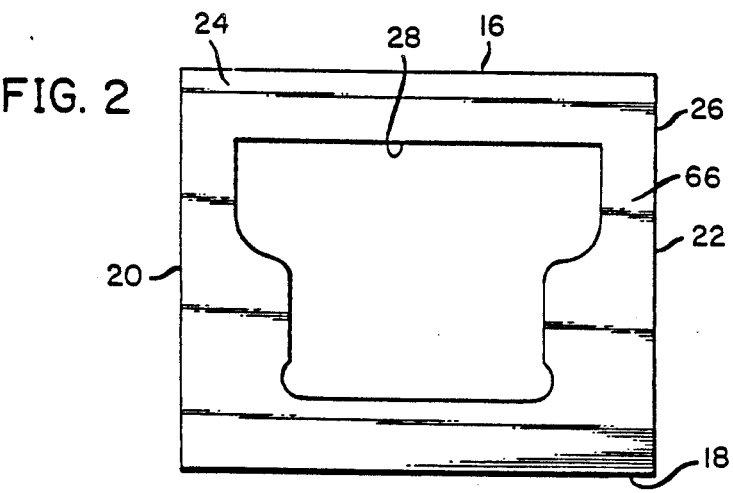
FIG. 2 is a planer view of the first embodiment of the template tray.

Applicant's invention relates to a template tray 14 as shown in FIG. 1 or FIG. 2 as the first embodiment, template tray 14 being substantially planer in nature, having four edges, 16, 18, 20 and 22, and a front face 24 and a bottom face 26. Template tray 14 being substantially planer in nature, has an aperture 28 positioned therethrough, aperture 28 designed and configured to conform to the shape or configuration of hand scanner or optical character reader 10. In the configuration shown in FIG. 1, aperture 28 is substantially T-shaped in cross sectional area to conform to the substantially T-shaped cross sectional configuration of hand scanner 10 as shown. It will be recognized by those skilled in the art that template tray 14 and, in particular, aperture 28, can be varied to conform with the cross sectional configuration of various hand scanners which may vary in configuration depending upon the manufacturer's considerations.

Template tray 14 is used in conjunction with guide 50. Guide 50 comprises a substantially rectangular configuration having a planer base 52 having upstanding ribs 54, longitudinally positioned along the longitudinal edges of planer base 52. In this configuration shown in FIG. 1, guide 50 is U-shaped being closed at end 56 and open at end 57 with ribs 54 and a marginal portion 60 of guide 50 comprising the legs of the U shape. In this configuration, guide 50 is designed to be placed over a standard sheet of 8 ½×11, or 8 ½×14 paper. It will be noted by those skilled in the art that the dimensions of planer base 50 may be modified to accommodate paper of significantly different dimensions.

In this configuration, guide 50 may be placed directly over a piece of paper 62 containing textual material or graphics while said paper is in a horizontal or inclined position on a desk or other solid object. As an additional embodiment of the invention, guide 50 may include a planer base plate 64 positioned below guide 50 such that the paper containing the textual or graphic material may be inserted between planer base plate 64 and guide 50 and maintained in position. This option is available without departing from the spirit and scope of the invention disclosed herein.

For the purposes of explanation, we will regard the paper 62 containing the textual material as being 8 ½ × 11 inches in diameter. The paper 62 is positioned such that its longitudinal edges are engaged with or slightly beneath marginal portion 60 of planer base 52. Template tray 14 would be positioned such that its longitudinal edge 22 was in intimate longitudinal contact with the corresponding longitudinal rib 54 of guide 50. Paper 62 is positioned such that the textual material is positioned between the edges of marginal portion 60 of guide 50. The longitudinal border 66 on template tray 14 which extends from the widest section of T-shaped aperture 28 to the longitudinal edges of template tray 14 would be of such a dimension so as to correspond to the width of margin portion 60 of planer base 52 of guide 50. This, therefore, ensures that the scanner 10 is positioned to read textual material on paper 62 extending from the edge of marginal portion 60 of planer base 52 to the approximate center of page 62.

In this configuration, template tray 14 with scanner 10 hand held within aperture 28 on template tray 14 would be positioned proximate to the top of paper 62 and drawn across paper 62 in order to scan and read one-half of the vertical page, transferring the characters read via electrical communication 12 to the computer. The operator in holding hand scanner 10 within aperture 28 on template tray 14 would draw the scanner and template tray over the vertical one-half of page 62 while maintaining longitudinal edge 22 of template tray 14 in contact with upstanding rib 54 on planer base 52. The operator would then shift the template tray 14 and hand-held scanner 10 to the opposing side of the page and position longitudinal edge 20 of template tray 14 against the opposite upstanding rib 54 on planer base 52. The operator would then repeat the movement of hand scanner 10 and template tray along this opposing upstanding rib 54 in order to read the second vertical half of the page.

It will be recognized that the dimensions of aperture 28 in template tray 14 will vary depending upon the shape and configuration of the particular hand scanner used by the operator. The configuration of template tray 14 can be varied with the understanding that the width of marginal portion 60 of planer base 52 must be substantially identical to the marginal portion 66 on template tray 14 at its widest-most point accommodating the hand scanner so that the reading portion of the hand scanner is positioned to read the textual material on paper 62.

FIGS. 3 and 4 show a second embodiment of the template tray and guide mechanism. In this configuration, as shown in FIG. 3, a perspective view, guide 50a is identical to guide 50, for receipt of the paper or document 62 having the graphic or textual material. Guide 50 has two upstanding longitudinal ribs 54; however, in the second embodiment, the template tray is modified so as to engage vertical, longitudinal upstanding ribs 54.

As best can be seen from FIG. 4, template tray 14a is substantially planer having an aperture 28a positioned therethrough, a configuration of which conforms to the hand scanner 10. In the second embodiment; however, the longitudinal edges 20a and 22a of template tray 14a have formed thereon, upstanding longitudinal ribs 68. Longitudinal upstanding ribs 68 are shown having a semi-circular cross sectional area; however, it will be recognized by those skilled in the art that the cross sectional area of upstanding ribs 68 may vary. The primary purpose of upstanding longitudinal ribs 68 is to overlap and engage the vertical longitudinal ribs 54a on guide 50a. In this configuration, the longitudinal edges 20 and 22 of template tray 14 which would, in the first embodiment, be in slidable contact with longitudinal vertical upstanding ribs 54 on guide 50 are replaced by vertical ribs 68 which overlap and engage vertical longitudinal ribs 54a on guide 50a. This configuration serves to further eliminate the possibility of an unsteady operator hand in sliding template tray 14 across one vertical longitudinal half of paper or document 62. Upstanding ribs 68 serve to engage and hold template tray 14 in secure alignment with the document or paper 62. In all other respects, including operation, the template tray 14a and guide 50a would be identical to that of the first embodiment.

The textual material read by the hand scanner 10 is electronically transferred to a data storage disk such as that associated with the personal computer. This transfer, conversion and storage is accomplished by a variety of optical character recognition software packages available on the market which are capable of reading a variety of typewriter fonts, graphics and illustrations. Presently, the primary transfer of such textual, graphic or other data occurs with respect to standardized sized paper in the nature of 8 ½ × 11 inches or 8 ½ by 14 inches. Hand scanners are primarily presently designed so as to read one-half of an 8 ½ × 11 inch page. As such, their dimensions are in the neighborhood of 4 inches in width. The development of larger hand scanners and associated software to read and transfer data from printed material larger than that previously stated is within the realm of possibility. The size of the hand scanner would be dictated only by convenience. Applicant's template tray and guide would have application to such larger hand scanners without departing from the spirit and scope of the invention. Applicant's planer guide 50 could be easily adjustable such that the receiving slot between U-shaped legs could be expanded to receive larger sized paper 62. Additionally, the reading aperture on template tray 14 could be enlarged to receive a larger hand scanner. In addition, larger paper containing textual printed matter could be read with the present embodiments by merely shifting planer guide 50 across the larger paper 62 and utilizing the template tray 14 and hand scanner 10 in the manner described. The only requirement with such adaptation would be a modified optical character recognition software package to align the textual material read by the hand scanner 10 within the personal computer.

It will be recognized by those skilled in the art that the apparatus has been described in connection with the exemplary embodiments thereof and it will be understood that many modifications will be apparent to those of ordinary skill in the art that this application is intended to cover any adaptations or variations thereof. Therefore, it is manifestly intended that the invention be only limited by the claims and the equivalents thereof.

I claim:

1. An image reader guide for hand-held image readers, said hand-held image readers having a reading aperture through which printed matter is exposed and focused on a photoelectric cell array by means of a light source, said printed matter electronically transferred to a data storage source, said image reader guide cooperating with said image reader for alignment of said image reader and said printed matter, said image reader guide comprising:
- a general U-shaped planer guide having two planer legs;
- a receiving slot disposed between said two planer legs for receipt of said printed matter;
- opposing parallel longitudinal ribs positioned adjacent the longitudinal edge of said two planer legs of said planer guide;
- a planer template tray having longitudinal edges for cooperation with said parallel longitudinal ribs of said planer guide, said planer template tray interlocking with said longitudinal ribs of said planer guide, said longitudinal edges of said planer template tray having longitudinal ribs which selectively overlap and interlock with said longitudinal ribs of said planer guide, said planer template tray having an aperture therethrough configured to said reading aperture of said image reader, said longitudinal edges of said planer template tray positioned in successive overlapping contact with each of said opposing longitudinal ribs of said planer guide positioning said aperture of said planer template tray and said image reader in alignment with said printed matter, said planer template tray and said image reader being drawn perpendicularly across said printed matter while said planer template tray is in successive interlocking contact with said opposing longitudinal ribs of said planer guide, said image reader electronically transferring one-half of said printed matter to said data storage source with each pass.

* * * * *